US010102230B1

(12) United States Patent
Muniswamy Reddy et al.

(10) Patent No.: US 10,102,230 B1
(45) Date of Patent: Oct. 16, 2018

(54) RATE-LIMITING SECONDARY INDEX CREATION FOR AN ONLINE TABLE

(71) Applicant: Amazon Technologies, Inc., Seattle, WA (US)

(72) Inventors: Kiran Kumar Muniswamy Reddy, Sammamish, WA (US); Wei Xiao, Bellevue, WA (US); Pejus Manoj Das, Shoreline, WA (US); Lokendra Singh Panwar, Seattle, WA (US); Xianglong Huang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 382 days.

(21) Appl. No.: 14/859,069

(22) Filed: Sep. 18, 2015

(51) Int. Cl.
*G06F 7/00* (2006.01)
*G06F 17/30* (2006.01)
*H04L 29/08* (2006.01)
*H04L 12/26* (2006.01)
*G06F 13/14* (2006.01)

(52) U.S. Cl.
CPC .. *G06F 17/30321* (2013.01); *G06F 17/30345* (2013.01); *H04L 43/0888* (2013.01); *H04L 67/10* (2013.01)

(58) Field of Classification Search
CPC ......... G06F 17/30286; G06F 17/30321; G06F 17/30339; G06F 17/30345; G06F 17/30365; G06F 17/30575; G06F 17/30336; G06F 17/30581; G06F 17/30312; G06F 17/30483; G06F 17/3002; G06F 17/30097;
(Continued)

(56) References Cited

U.S. PATENT DOCUMENTS 8,572,091 B1 * 10/2013 Sivasubramanian ........................
G06F 17/3033
707/747
8,601,000 B1 * 12/2013 Stefani .............. G06F 17/30002
707/747

(Continued)

OTHER PUBLICATIONS

"Global Secondary Indexes", Amazon DynamoDB, Retrieved from URL: http://docs.amazon.com/amazondynamodb/latest/developerquide/GSI.html on Jul. 2, 2016, pp. 1-9.
(Continued)

*Primary Examiner* — Syling Yen
*Assistant Examiner* — Cecile Vo
(74) *Attorney, Agent, or Firm* — Robert C. Kowert; Meyertons, Hood, Kivlin, Kowert & Goetzel, P.C.

(57) ABSTRACT

A data storage system may implement rate-limiting secondary index creation for an online table. A secondary index may be generated for a table stored in a data store. The table may be incrementally indexed, maintaining the updates determined according to indexing different portions of the table in a queue of pending updates that are subsequently applied at the secondary index. Prior to indexing a portion of the table, an evaluation of a current number of pending updates in the queue of pending updates may be performed with respect to a throttle threshold. If the current number of pending updates exceeds the throttle threshold, then indexing the portion of the table may be throttled. Received updates to previously indexed portions of the table, may be applied to the table and placed in the queue of pending updates without an evaluation of the current number of pending requests.

20 Claims, 8 Drawing Sheets

(58) Field of Classification Search
CPC ......... G06F 17/30176; G06F 17/30619; G06F 17/30769; G06F 17/30
USPC ....... 707/968, 972, 803, 610, 634, 741, 802, 707/812, 705, E17.01, E17.002, E17.014, 707/999.001, E17.017, E17.054, E17.108, 707/609, 625, 696, 713, 736, 999.01
See application file for complete search history.

(56) References Cited

U.S. PATENT DOCUMENTS

| | | | |
|---|---|---|---|
| 8,732,517 B1* | 5/2014 | Stefani | G06F 17/30584 707/610 |
| 2005/0193245 A1* | 9/2005 | Hayden | G06F 11/2069 714/13 |
| 2007/0239769 A1* | 10/2007 | Fazal | G06F 17/30554 |

OTHER PUBLICATIONS

U.S. Appl. No. 14/859,053, filed Sep. 18, 2015, Kiran Kumar Muniswamy Reddy et al.
U.S. Appl. No. 14/859,055, filed Sep. 18, 2015, Kiran Kumar Muniswamy Reddy et al.
U.S. Appl. No. 14/859,072, filed Sep. 18, 2015, Kiran Kumar Muniswamy Reddy et al.
U.S. Appl. No. 14/859,059, filed Sep. 18, 2015, Kiran Kumar Muniswamy Reddy et al.
U.S. Appl. No. 14/859,075, filed Sep. 18, 2015, Aanchal Gupta et al.
U.S. Appl. No. 14/859,062, filed Sep. 18, 2015, Wei Xiao et al.
U.S. Appl. No. 14/858,360, filed Sep. 18, 2015, Aanchal Gupta et al.

* cited by examiner

RATE-LIMITING SECONDARY INDEX CREATION FOR AN ONLINE TABLE

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may receive a high volume of request traffic to access data and to manage the storage of data. Different mechanisms for structuring, arranging, or otherwise making data available may be implemented in order to service requests. Secondary indexes, for example, provide an alternative arrangement of data stored in a database system which may be accessed more efficiently for certain information requests. Data indexed in one fashion at a database may be indexed in a different fashion at a secondary index. Creating secondary indexes, however, can be challenging. Secondary index creation can be resource intensive and may create opportunities for inconsistency between data stored in the database table and the secondary index.

Figure 1:
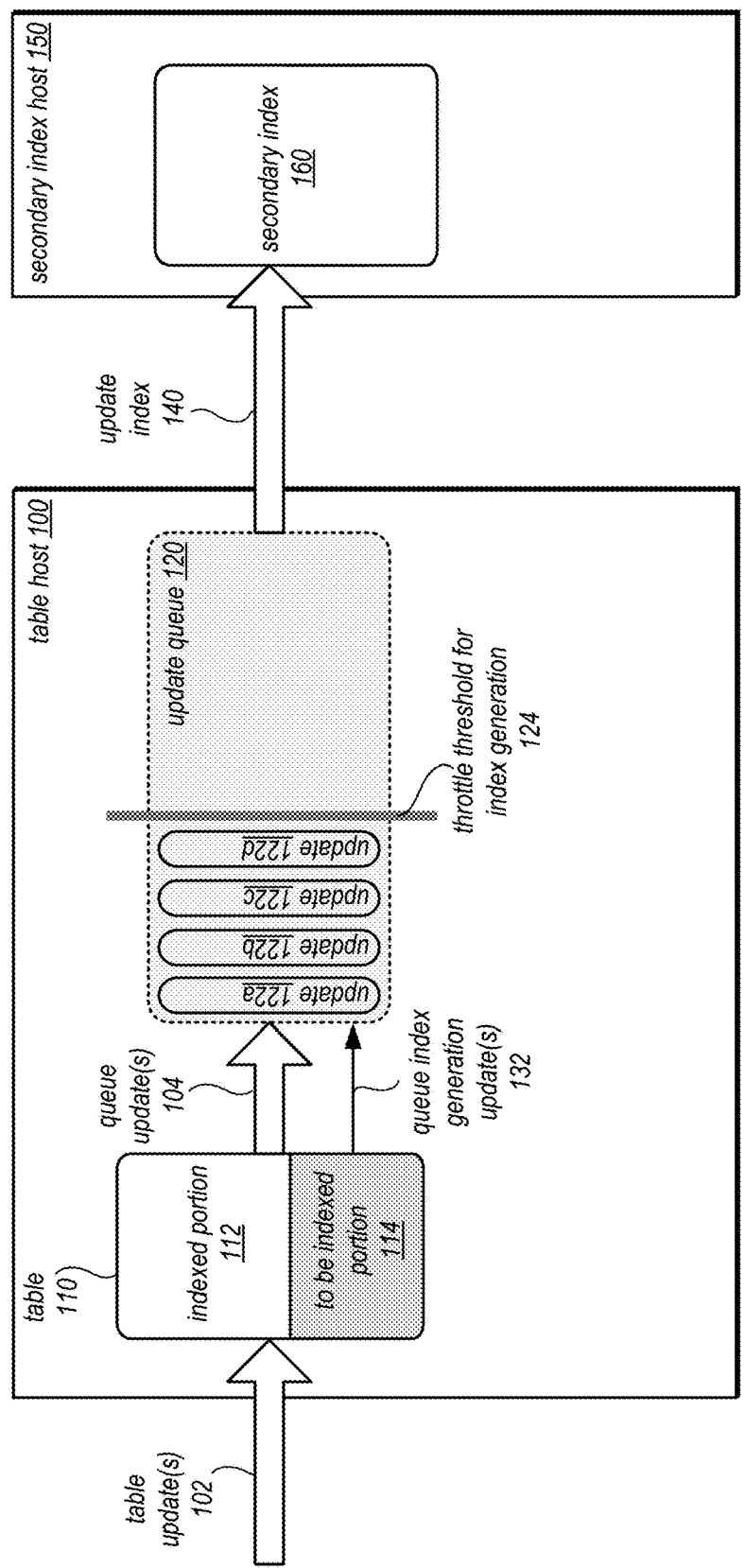
FIG. 1 is a logical block diagram illustrating rate-limiting secondary index creation for an online table, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement rate-limiting secondary index creation for an online table. Data stores offer accessible and scalable storage to one or more multiple different clients. Tables of items (which may include one or more data values or attributes) may be stored, managed and accessed at a data store. Different types of data stores exist. Relational data stores may be implemented which organize and maintain data according to a relational scheme (e.g., a common set of data fields for an entry in a table). Non-relational data stores may be implemented which organize and maintain data according to a key value pair which uniquely identifies an item in the table. Key value pairs, or other indexing schemes (which may also be implemented in relational data stores) may allow for fast throughput to update data in items or store new items. However, in some scenarios, locating items that have particular attributes may be resource intensive. For instance, if a non-relational data store is only searchable by key value pair, identifying items with a particular attribute value that is within a range of values would likely instigate a scan of an entire table even though the range of may be only a small portion of possible values for the particular attribute or the particular attribute may not exist for some items in the table.

Secondary indexes may be created for a table in a relational or non-relational data store in order to provide an alternative access schema for items in addition to a unique key value pair. For instance, a table that includes items for registered users may include a user identifier, which is unique and primary key for the item, along with a first name attribute, last name attribute, gender attribute, and age attribute. A secondary index may be generated for the table which can index items according to other values than the key value pair, such as gender and age. For example, the secondary index may be generated so that all items with male attribute values are stored together according to age attribute value order. Similarly, all items with female attribute values are stored together according to age attribute value order. In this way, an access request for data that specifies a particular range of ages for males or females may be quickly obtained without performing a scan of the entire table of items, as noted above, (which may be very costly in the case of a non-relational data store). Other attribute values may also be included in the secondary index, such as first and last name attribute values. In at least some embodiments, the key value pair that uniquely identifies the item may be included in the secondary index (e.g., the user identifier). Once created, a secondary index can be updated with any changes made to the original table.

While secondary indexes can provide useful alternative access capabilities to data, creating the secondary index may be a long running operation. However, continuing to allow access to a table for which a secondary index is being created may incur problems with maintaining consistent data between the original table and the secondary index (which in a distributed data store may be implemented at a different data server or storage node). Updates to a table received from a client may need to be replicated to the secondary index in order to maintain consistent data. Different consistency models may be imposed. For example, a strongly consistent model may be implemented so that an update to the table cannot be visible until it is also visible at the secondary index. Alternatively, an eventually consistent model may be implemented so that an update to the table can be visible as long as the update is eventually visible at the secondary index. In order to implement these or other consistency models, operations that impact the replication of these updates to a secondary index may need to be reduced or eliminated. Rate-limiting secondary index creation may reduce the impact of secondary index creation upon replication of updates to a secondary index.

FIG. 1 is a logical block diagram illustrating rate-limiting secondary index creation for an online table, according to some embodiments. Table host 100 may be a storage node, server, or other computing device (e.g., system 1000 in FIG. 8) that stores part (e.g., a partition) or all of a table 110 for a non-relational data store. Secondary index host 150 may be a storage node, server, or other computing device (e.g., system 1000 in FIG. 8) that stores part (e.g., a partition) or all of a secondary index 160 created for the table 110 in the non-relational data store.

Table update(s) 102 may be received at table host 100. The updates may be applied to a table and queued 104 in update queue 120. The updates may then be de-queued and sent 140 to update secondary index 160. If the secondary index were already created, update queue 120 may be more than adequate to store table update(s) 102 and replication to secondary index 160 of received update(s) 102 may perform as desired. However, if the secondary index 160 is still being created, then table update(s) 102 may not be the only update(s) being queued in update queue 120. An online index generator may scan items from a portion 114 of the table for indexing. The online index generator may queue index generation update(s) 132 to create a new portion of secondary index 160 that corresponds to the indexed portion 114. However, it is possible for queued index generation update(s) 132 to fill update queue 120, which may block table update(s) 102 submitted by a client from completing (as table update(s) 102 may be denied if they cannot be replicated to secondary index 160). Not all table update(s) may be affected. Updates to previously indexed portion 112 may need to be replicated, whereas updates to be indexed portion 114 may be applied to the table alone (as online index generator 130 will capture the updates when the portion is indexed).

A throttle threshold for index generation 124 may be implemented which may be enforced to throttle indexing of a portion of the table if the number of pending updates exceeds throttle threshold. For instance, as illustrated in FIG. 1, for pending updates (122a, 122b, 122c, and 122d) are in update queue 120 and do not exceed throttle threshold 124. Therefore, online index generator 130 may proceed with indexing portion 114 of table 110. However, if 5 updates were included in update queue 120 instead of 4 (not illustrated), then throttle threshold 124 would be exceeded and online index generator 130 would throttle indexing of portion 114. Note that updates 122 may be index generation updates or table update(s). Both types of updates may be counted for purposes of comparing pending updates to threshold 124. Implementing throttle threshold 124 may reserve space above the threshold for storing subsequent table update(s) 102 (which are not throttled if the number of updates is above throttle threshold 124 and may only be limited subject to the total size of update queue 120).

Please note that previous descriptions are not intended to be limiting, but are merely provided as logical examples of rate-limiting secondary index creation for an online table.

This specification begins with a general description of storage service implementing a network-based data store that may also rate-limit secondary index creation for an online table. Then various examples of the storage service are discussed, including different components/modules, or arrangements of components/module, that may be employed as part of implementing the storage service. A number of different methods and techniques to rate-limit secondary index creation for an online table are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
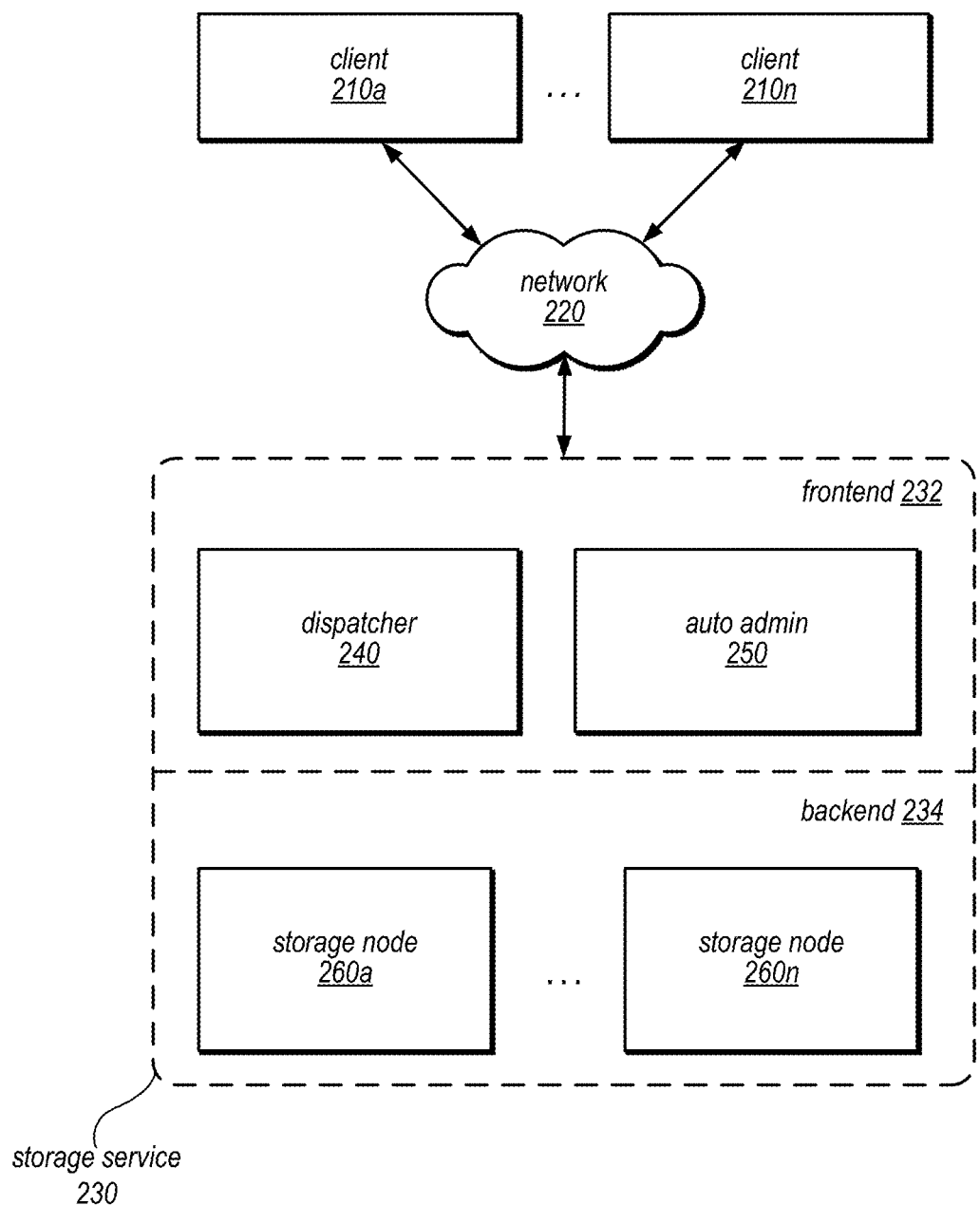
FIG. 2 is a block diagram illustrating a storage service that implements rate-limiting secondary index creation for an online table, according to some embodiments.

FIG. 2 is a block diagram illustrating a storage service that implements rate-limiting for creating a secondary index from an online table, according to some embodiments. It is noted that where one or more instances of a given component may exist, reference to that component herein below may be made in either the singular or the plural. However, usage of either form is not intended to preclude the other. In various embodiments, the components illustrated in FIGS. 2-4 may be implemented directly within computer hardware, as instructions directly or indirectly executable by computer hardware (e.g., a microprocessor or computer system), or using a combination of these techniques. For example, the components of FIG. 2 may be implemented by a distributed system including a number of computing nodes (or simply, nodes), such as computing system 1000 in FIG. 8 described below. In various embodiments, the functionality of a given storage service system component may be implemented by a particular computing node or may be distributed across several computing nodes. In some embodiments, a given computing node may implement the functionality of more than one storage service system component.

Generally speaking, clients 210a-210n may encompass any type of client configurable to submit web services requests to network-based storage service 230 via network 220. For example, a given storage service client 210 may include a suitable version of a web browser, or a plug-in module or other type of code module configured to execute as an extension to or within an execution environment provided by a web browser to provide database or data storage service clients (e.g., client applications, users, and/or subscribers) access to the services provided by network-based services platform 230. Alternatively, a storage service client 210 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 210 may be an application configured to interact directly with network-based storage service 230. In various embodiments, storage service client 210 may be configured to generate web services requests according to a Representational State Transfer (REST)-style web services architecture, a document- or message-based web services architecture, or another suitable web services architecture.

In some embodiments, storage service client 210 may be configured to provide access to network-based storage service 230 to other applications in a manner that is transparent to those applications. For example, storage service client 210 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to network-based storage service 230 may be coordinated by storage service client 210 and the operating system or file system on behalf of applications executing within the operating system environment.

Storage service clients 210 may convey web services requests to and receive responses from network-based storage service 230 via network 220. In various embodiments, network 220 may encompass any suitable combination of networking hardware and protocols necessary to establish web-based communications between clients 210 and network-based storage service 230. For example, network 220 may generally encompass the various telecommunications networks and service providers that collectively implement the Internet. Network 220 may also include private networks such as local area networks (LANs) or wide area networks (WANs) as well as public or private wireless networks. For example, both a given client 210 and network-based storage service 230 may be respectively provisioned within enterprises having their own internal networks. In such an embodiment, network 220 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based storage service 230. It is noted that in some embodiments, storage service clients 210 may communicate with network-based storage service 230 using a private network rather than the public Internet. For example, clients 210 may be provisioned within the same enterprise as the data storage service (and/or the underlying system) described herein. In such a case, clients 210 may communicate with network-based storage service 230 entirely through a private network 220 (e.g., a LAN or WAN that may use Internet-based communication protocols but which is not publicly accessible).

Generally speaking, network-based storage service 230 may be configured to implement one or more service endpoints configured to receive and process web services requests, such as requests to access tables maintained on behalf of clients/users by a database service or a data storage service, and/or the items and attributes stored in those tables. For example, network-based storage service 230 may include hardware and/or software configured to implement various service endpoints and to properly receive and process HTTP-based web services requests directed to those endpoints. In one embodiment, network-based storage service 230 may be implemented as a server system configured to receive web services requests from clients 210 and to forward them to various components that collectively implement a data storage system for processing. In other embodiments, network-based storage service 230 may be configured as a number of distinct systems (e.g., in a cluster topology) implementing load balancing and other request management features configured to dynamically manage large-scale web services request processing loads.

As illustrated in FIG. 3, network-based storage service 330 may include a dispatcher 340 (which may be configured to receive, authenticate, parse, throttle and/or dispatch service requests, among other things), one or more administrative components, or auto admin instances, 350 (which may be configured to provide a variety of visibility and/or control functions, as described in more detail herein) which may be implemented as part of frontend 232. Storage service 230 may also implement a plurality of storage node instances (shown as 360a-360n), each of which may maintain and manage one or more tables on behalf of clients/users or on behalf of the data storage service (and its underlying system) itself, as part of backend 234. Some of the functionality provided by each of these types of components is described in more detail herein, according to various embodiments. Note that in some embodiments, network-based storage service 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 2. Note also that in various embodiments, one or more database instances may be implemented on each of the storage nodes 360a-360n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, network-based storage service 230 may be configured to support different types of web services requests. For example, in some embodiments, network-based storage service 230 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments network-based storage service 230 may implement various client management features. For example, service 230 may coordinate the metering and accounting of client usage of web services, including storage resources, such as by tracking the identities of requesting clients 210, the number and/or frequency of client requests, the size of tables and/or items stored or retrieved on behalf of clients 210, overall storage bandwidth used by clients 210, class of storage requested by clients 210, and/or any other measurable client usage parameter. Network-based storage service 230 may also implement financial accounting and billing systems, or may maintain a database of usage data that may be queried and processed by external systems for reporting and billing of client usage activity. In some embodiments, network-based storage service 230 may include a lock manager and/or a bootstrap configuration (not shown).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, scan (e.g., list items) over the whole table, optionally filtering the items returned, and create one or more secondary indexes global to the whole table which may be used to perform different queries efficiently over particular attributes in the table that are used to create the secondary index. The amount of work required to satisfy service requests that specify these operations may vary depending on the particular operation specified and/or the amount of data that is accessed and/or transferred between the storage system and the client in order to satisfy the request. Thus, storage service 230 may identify some requests for synchronous processing while other requests may be identified for asynchronous processing.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, a partition replica may be assigned to a particular storage node based largely (or solely) on whether there is enough storage capacity for the anticipated size of the table. For example, the anticipated size may be based on information included in a request to create the table, on usage history for the client on whose behalf the table was created, or on a history of accesses that target the table, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node).

In various embodiments, a database service or data storage service may be implemented on one or more computing nodes that are configured to perform the functionality described herein. In some embodiments, the service may be implemented by a network-based storage service (such as network-based storage service 230 in FIG. 2) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other network-based services or applications, in some embodiments).

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 3A:
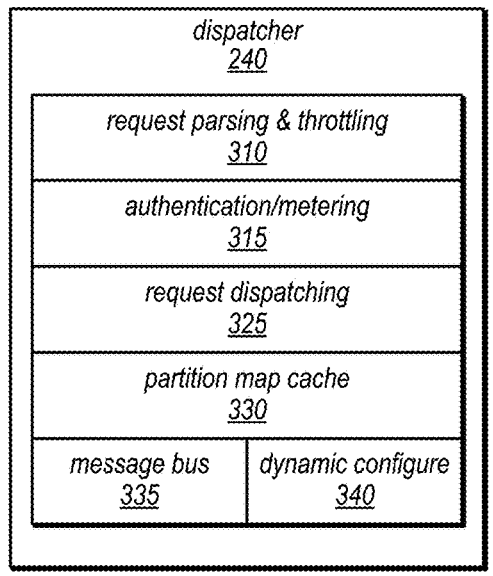
FIGS. 3A-3C are block diagrams illustrating various components of a storage service, according to some embodiments.
Figure 3B:
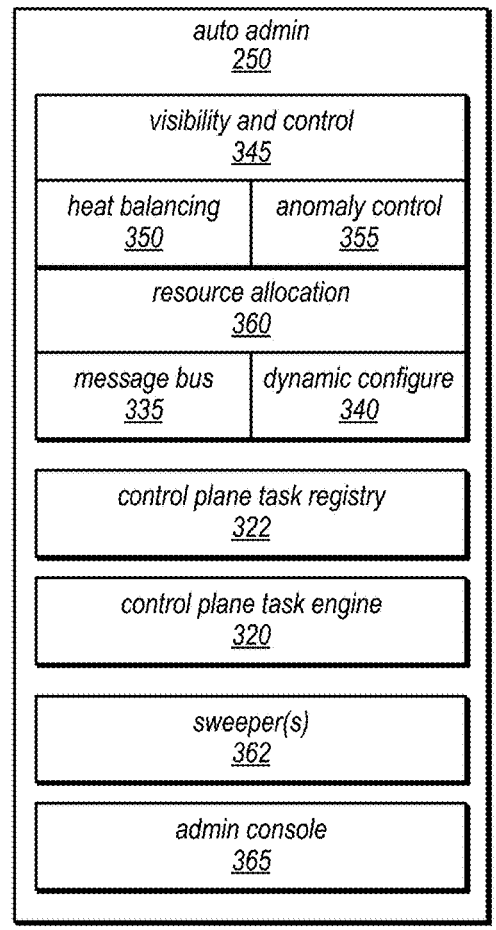
Figure 3C:
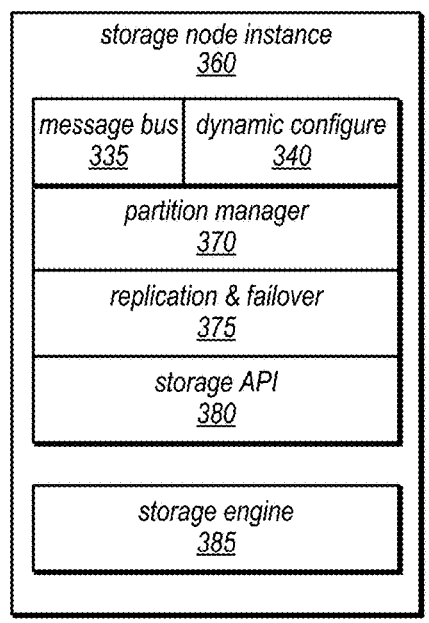

FIGS. 3A-3C illustrate various elements or modules that may be included in each of the types of components of network-based storage service 230, according to one embodiment. As illustrated in FIG. 3A, dispatcher 240 may include one or more modules configured to perform parsing and/or throttling of service requests (shown as 310), authentication and/or metering of service requests (shown as 315), dispatching service requests (shown as 325), and/or maintaining a partition map cache (shown as 330). In addition to these component-specific modules, dispatcher 240 may include components that are common to multiple types of computing nodes that collectively implement Web services platform 330, such as a message bus (shown as 335) and/or a dynamic configuration module (shown as 340). In other embodiments, more, fewer, or different elements may be included in dispatcher 240, or any of the elements illustrated as being included in dispatcher 240 may be included in another component of network-based storage service 230 or in a component configured to interact with network-based storage service 230 to provide the data storage services described herein.

As illustrated in FIG. 3B, auto admin instance 250 may include one or more modules configured to provide visibility and control to system administrators (shown as 345), or to perform heat balancing (shown as 350), and/or anomaly control (shown as 355), resource allocation (shown as 360). In some embodiments, resource allocation module 360, heat balancing module 350, anomaly control module 355, control plane event registry 322, control plane task engine 320, and/or sweeper module(s) 362, may be configured to work separately or in combination to perform identifying requests for asynchronous processing and performing asynchronous processing of requests, as described in more detail below. Auto admin instance 250 may also include an admin console 365, through which system administrators may interact with the data storage service (and/or the underlying system). In some embodiments, admin console 365 may be the primary point of visibility and control for the data storage service (e.g., for configuration or reconfiguration by system administrators). For example, admin console 365 may be implemented as a relatively thin client that provides display and control functionally to system administrators and/or other privileged users, and through which system status indicators, metadata, and/or operating parameters may be observed and/or updated.

Auto admin instance 250 may include, in some embodiments control plane task registry 322. Control plane task registry 322 may provide an interface or access to information stored about one or more detected control plane events, such as requests to be processed, at storage service 230. In at least some embodiments, control plane task registry 322 may be implemented to interface with a table or data object that can be changed, updated or written to by other modules of auto admin instance 250, such as sweeper modules 362 or control plane task engine 320. For example, in some embodiments control plane event data may be stored on a database table that is accessible via control plane task registry 322. In at least some embodiments, other service systems, nodes, devices, instances, etc. may send registration messages for detected control plane events, updates, or some other form of request to auto admin instance 250 for storage in task registry 322.

Control plane event registration messages may, in various embodiments, include information about the detected control plane event. For example, control plane event messages may include the event trigger, such as a particular client or module (e.g., sweeper module). Information about the one or more control plane operations to be performed in response to the control plane event, such as the request type or the resources to be utilized (e.g., storage nodes) may be included.

Auto admin instance 250 may also include control plane task engine 320. As noted above, in some embodiments, multiple instances of auto-admin 250 may be implemented with one instance performing the control plane task engine function, and other deputy instances implementing the sweeper(s). However, in some embodiments a single auto-admin instance may be configured to perform both task scheduling and implement the tasks handlers to perform the scheduled control plane event operations.

Control plane task engine 320 may be configured to direct the performance of different types of control plane operations among the nodes, systems, or devices implementing network-based storage service 230. For instance, task engine 320 may be configured to communicate with master nodes of clusters of storage nodes to initiate the performance of various control plane operations, such as moves, splits, update tables, delete tables, create indexes, etc. . . . Task engine 320 may also be configured to update task registry 322 (or some other table or data structure) with the status, state, or performance information of the tasks currently being performed. For example, for each child operation or subtask of a control plane operation, an update may be sent to update a respective entry in the record of the detected event to which the operation corresponds. Control plane task engine 320 may also provide updates indicating the resources that are currently utilized to perform the control plane operation, such as the particular replica, data, node, system, or device.

In various embodiments, control plane task engine 320 may be configured to perform an update table operation type. An update table operation may change or modify a performance attribute or value for the maintained table. For instance, in some embodiments, tables may have a provisioned throughput performance (e.g., a certain number of IOPS). An update table operation may change the provisioned throughput performance of the table to a different throughput performance. An update table operation may perform various sub-tasks or child operations. Upon completion or initiation of these or various other steps for performing an update table operation, task handler 150 may be configured to send/write updates to control plane event registry 120 for the detected event. An update table event may be triggered externally, for example by a client API request. In at least some embodiments, an update table API request may be identified for asynchronous processing. Alternatively, one or more internal maintenance operations, such as sweeper modules 362 may trigger an update table operation.

In various embodiments, control plane task engine may be configured to perform a secondary index creation operation in response to a client API request. For instance, in some embodiments, attributes of table may be identified for the creation of a new index for the table. Control plane task engine 320 may identify new storage node instance(s) 360 to host the index and direct storage node instance(s) 360 in the performance of scanning, building, and copying of the index to the new storage nodes instance(s) 360. In at least some embodiments, a create secondary index API request may be identified for asynchronous processing.

In addition to these component-specific modules, auto admin instance 250 may also include components that are common to the different types of computing nodes that collectively network-based storage service 230, such as a message bus (shown as 335) and/or a dynamic configuration module (shown as 340). In other embodiments, more, fewer, or different elements may be included in auto admin instance 250, or any of the elements illustrated as being included in auto admin instance 250 may be included in another component of network-based storage service 230 or in a component configured to interact with network-based storage service 230 to provide the data storage services described herein.

As illustrated in FIG. 3C, storage node instance 360 may include one or more modules configured to provide partition management (shown as 370), to implement replication and failover processes (shown as 375), and/or to provide an application programming interface (API) to underlying storage (shown as 380 Various different ones of the control plane operations described above may be performed locally (e.g., on a given storage node instance 360) based, e.g., on one or more measures of the utilization of provisioned resources on the storage devices or logical storage volumes of the storage node instance.

As noted above, different storage nodes may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a master node, performing special functions with regard to access requests directed toward the partition maintained by replica group 1. For replica group 2, however, storage node B may be the master node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

As illustrated in this example, each storage node instance 360 may include a storage engine 385, which may be configured to maintain (i.e. to store and manage) one or more tables (and associated table data) in storage 380 (which in some embodiments may be a non-relational database) on behalf of one or more clients/users. In addition to these component-specific modules, storage node instance 360 may include components that are common to the different types of computing nodes that collectively implement Network-based storage service 230, such as a message bus (shown as 335) and/or a dynamic configuration module (shown as 340). In other embodiments, more, fewer, or different elements may be included in storage node instance 360, or any of the elements illustrated as being included in storage node instance 360 may be included in another component of network-based storage service 230 or in a component configured to interact with network-based storage service 230 to provide the data storage services described herein.

Note that in some embodiments, it may not be necessary to perform some or all of the throttling, authentication, and/or metering operations that would typically be provided by dispatcher 240 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 250 (e.g., heat balancing and/or resource allocation) may or may not be applied in managing tables in a single-tenant environment. However, other operations illustrated as being performed by auto admin instance 250 (or various modules thereof) may be applied in the creation and/or management of tables in both multi-tenant and single-tenant environments.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited. These attributes may also be described by system resource metadata and anomalies between these attributes and system resource metadata may be detected.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table or to create a secondary index for a table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

Figure 4:
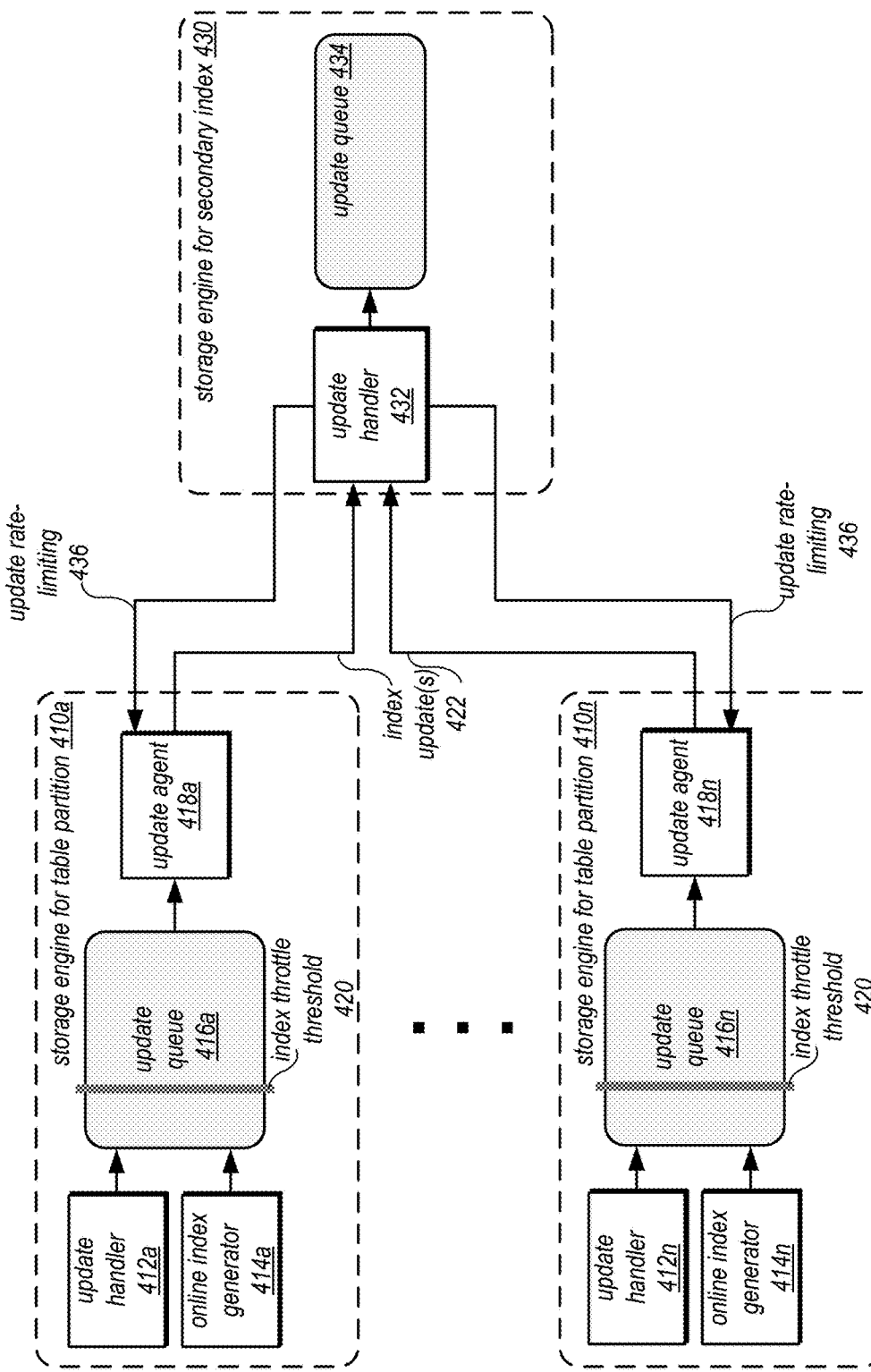
FIG. 4 is a logical block diagram illustrating multiple table partitions that implement rate-limiting secondary index creation for an online table, according to some embodiments.

As noted above, a table may be stored in multiple partitions at different storage nodes or hosts. Storage engines at the respective storage hosts, such as storage engine 385 in FIG. 3, may be configured to perform incremental indexing of tables to create a secondary index and may impose rate-limiting upon the indexing. FIG. 4 is a logical block diagram illustrating multiple table partitions that implement rate-limiting secondary index creation for an online table, according to some embodiments.

Multiple storage nodes may store a partition of a table. As illustrated in FIG. 4, the storage engines for the storage nodes, storage engines 410*a* through 410*n*, may provide index updates 422 to a storage node or host maintaining the secondary index (or partition of the secondary index as the secondary index may also be partitioned). The storage engine for the secondary index 430 may process the index update(s) so that the updates are ultimately applied to the secondary index.

In various embodiments, storage engines 410 may implement an online index generator (e.g., online index generators 414a to 414n) to incrementally index portions of table to create a secondary index for the table. Prior to indexing a portion of the table, online index generator 414 may evaluate the number of pending updates in update queue 416 according to index throttle threshold 420. If the number of pending updates in queue 416 does not exceed index throttle threshold 420, then indexing of the portion of the table may proceed. If the number of pending update requests does exceed index throttle threshold 420, then online index generator may throttle indexing of the portion of the table. In this way, updates for generating the index may not consume the entire update queue 416 as throttle threshold ensures that space in the queue above index throttle threshold 420 may only be used to store other updates to the secondary index (such as updates generated by update handler 412 and discussed below). Note that index throttle threshold 420 may be the same for different partitions even if the updates in respective queues (e.g., 416a and 416n) may be different, in some embodiments. In other embodiments, throttle thresholds may be different from one partition of a table to another. Online index generator 414 may scan a portion of the table, identify items, attributes, or other data to include in the secondary index according to an indexing schema specified for the secondary index, and generate updates to include the identified items, attributes, or other data in the secondary index. As illustrated in FIG. 4, online index generator 414 may then place updates in update queue 416.

Storage engines 410 may also implement an update handler (e.g., update handlers 412a to 412n). Update handlers 412 may be implemented to process updates to a table undergoing index creation. Some updates (e.g., to portions of the table that have not been indexed) may be applied by update handler 412 to the table without further processing. For those updates that update previously indexed portions of the table, update handler 412 may place an update in update queue 416. Updates may be placed in update queue 416 without regard to index throttle threshold 420. If update queue 416 has no storage space available for an update, then update handler 412 may deny the update.

Storage engines 410 may implement an update agent (e.g., agents 418a to 418n) which may retrieve updates from update queue 416 and send requests for index update(s) 422 to storage engine 430, which in turn may implement an update handler 432 to process the update requests. Update agent 418 may retrieve and send index update(s) 422 from queue 416 at a specified rate. In at least some embodiments, update handler 432 (or other component for storage engine for the secondary index 430 may update the rate-limit 436 to increase or decrease the rate at which index update(s) 422 are sent to storage engine for secondary index 430. For instance, if the update queue 434 at storage engine 430 is becoming full, update handler 432 may send back-off instructions to update agents 418 so that storage engine 430 is not forced deny index update(s) 422.

Figure 5:
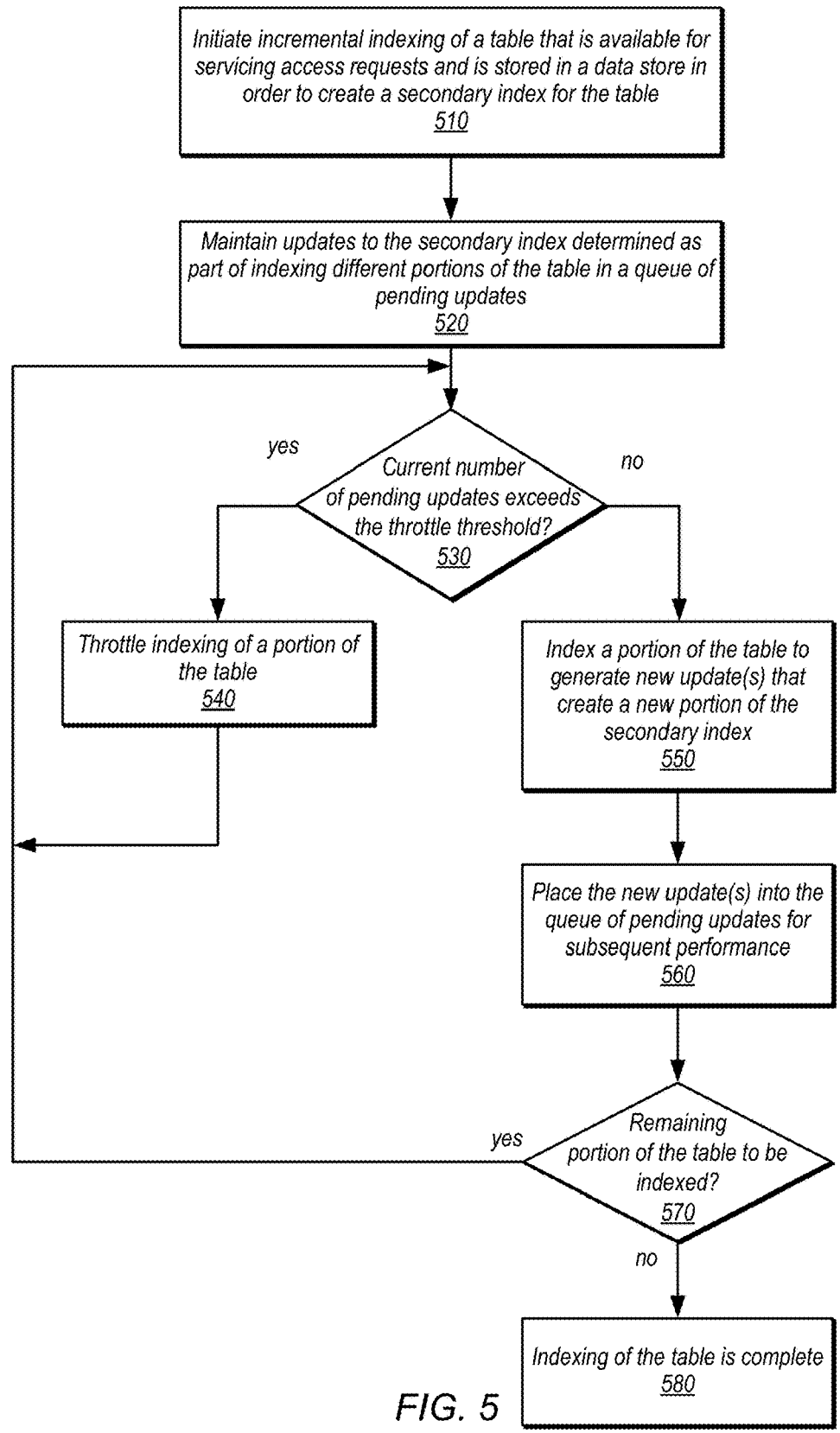
FIG. 5 is a high-level flowchart illustrating various methods and techniques to implement rate-limiting secondary index creation for an online table, according to some embodiments.

The examples of rate-limiting secondary index creation for online tables in a non-relational data store in FIGS. 2-4 have been given in regard to a data storage service (which may be a non-relational or NoSQL database service). However, various other types of data stores that may provide online generation of a secondary index may implement rate-limiting for secondary index creation, such as relational data stores (which may be distributed). FIG. 5 is a high-level flowchart illustrating various methods and techniques to implement rate-limiting secondary index creation for an online table, according to some embodiments. These techniques may be implemented using one or storage nodes as described above with regard to FIGS. 2-4, as well as other databases, storage systems, and/or different implementations of a client and/or storage engine, and thus the following discussion is not intended to be limiting as to the other types or configurations of non-relational data stores that may implement the described techniques.

Creation of a secondary index for a table stored in a data store may be performed while the table is online, available for servicing access requests to data stored in the table. Creation of a secondary index may be initiated as a result of a request to create the secondary index, which may identify an indexing schema for items in the secondary index. For example, the request may indicate two different attributes to be utilized for indexing items in the secondary index as a hash key and a range key, or a single attribute as the hash key. Other attributes to be included in the secondary index in addition to the hash and/or range key may be specified. Creation of the secondary index may be performed by initiating incremental indexing of the table, in various embodiments, as indicated at 510.

Incremental indexing may index different portions of the table according to a determined indexing schema for the secondary index (as may be specified in the creation request noted above). For instance, different ranges of items (or item attribute values) may be evaluated in a contiguous order. Incremental indexing may be performed as a background process so that foreground process operations, such as servicing access requests, may execute with little interference from the indexing. In order to control the rate at which updates to a secondary index are made, a queue of updates to the secondary index may be maintained. The queue may store any updates to be performed at the secondary index, whether placed in the queue as a result of a client update request to the table, or an update request determined as part of generating the secondary index. Thus, as indicated at 520, updates to the secondary index determined as part of indexing different portions of the table may be maintained in the queue. The updates may then be removed according to the queue and sent to the secondary index for performance (singly or in batches). Applied updates at the secondary index may be removed from the queue.

Prior to indexing a portion of the table, an evaluation of the current number of pending updates in the queue with respect to a throttle threshold may be made, as indicated at 530. For instance, the current number of pending updates (e.g., 119) may be compared with the throttle threshold (e.g., 100). If the current number of pending updates exceeds the throttle threshold, as in the above example where 119>100, then indexing of the portion of the table may be throttled, as indicated at 540. For example, indexing portions of the table may be performed by one or more processing threads which may be suspend for a period of time (e.g., 50 milliseconds) before retrying to index the portion of the table. During the time in which the indexing of the portion of the table is throttled, updates to the secondary index that are pending in the queue may succeed and be removed from the queue. Therefore, as indicated by the arrow from 540 to 530, another attempt to index the portion of the table may be attempted by evaluating the current number of pending updates in the queue with respect to the throttle threshold after a throttle-induced delay.

As indicated by the negative exit from 530, if the current number of pending updates in the queue does not exceeding the throttle threshold, the indexing of the portion of the table may be performed, as indicated at 550. For example, portion of the table may be scanned and analyzed according to the specified indexing schema for the secondary index (e.g., looking for items with particular attributes, attribute values or ranges of attribute values, such as gender attribute and age attribute value in the range "20-39". The indexed portion may be used to create a new portion of the secondary index. Updates may be determined according to the index which may indicate changes to be performed to the secondary index in order to include those items identified for inclusion based on the indexing (e.g., the identified items that have the gender attribute and age attribute values in the range "29-30").

As indicated at 560, these updates may be placed into the queue of pending updates for subsequent performance at the secondary index. If a remaining portion of the table has yet to be indexed, then the evaluation of the current number of pending updates may be performed again (in order to throttle the indexing of the next portion of the table if necessary). If no portion of the table remains to be indexed, then as indicated by the negative exit from 570, the indexing of the table may be considered complete. Note, that in some embodiments, the indexing of the table may not be considered complete until the updates for creating the secondary index in the queue of pending updates have been applied and removed.

Tables in data stores may be partitioned and distributed. Thus, the techniques described above may be performed at multiple different partitions (e.g., at different storage hosts) to create the secondary index for the table. Respective queues of pending updates may be maintained for each partition, in some embodiments. Secondary indexes may also be partitioned. The above techniques may also be implemented, in some embodiments, to be performed for indexing table portions with respect to updates for a particular index partition (e.g., a queue of pending updates may be maintained for each partition).

The throttle threshold used to rate-limit indexing of the online table may be determined in various ways. For instance, the throttle threshold may be a client-specified value which may be included in a request to create the secondary index. In some embodiments, the throttle threshold may be determined based on the provisioned throughput capacity for the table (e.g., logical work or service units, such as IOPS, allocated for performing updates to the table). For instance, a throttle threshold may be defined as a percentage or fraction of the total size of the queue, which in turn may be determined by the provisioned throughput capacity. Consider a provisioned throughput capacity of 100 IOPS for a table. The total size of the queue may be determined by multiplying the provisioned throughput capacity for the table by a period of time (e.g., 10 seconds× 100 IOPS=1000 total queue size). If the throttle threshold is defined as 25% of the total queue size, then the throttle threshold in this example is 250 (0.25×1000). Please note that as some tables may be partitioned, the above example may be determined based on the throughput capacity for an individual partition (e.g., 800 IOPS for a table in 4 partitions may result in each partition with 200 IOPS throughput capacity).

Figure 6:
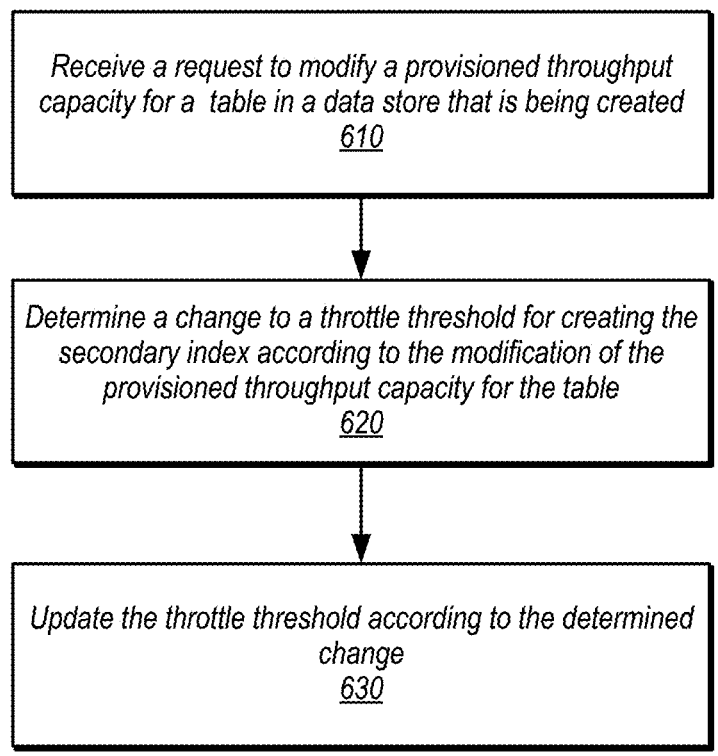
FIG. 6 is a high-level flowchart illustrating various methods and techniques to update a throttle threshold for rate-limiting secondary index creation for an online table, according to some embodiments.

Provisioned throughput capacity for a secondary index may change. In at least some embodiments, the throttle threshold may dynamically adjust to account for provisioned throughput capacity changes. FIG. 6 is a high-level flowchart illustrating various methods and techniques to update a throttle threshold for rate-limiting secondary index creation for an online table, according to some embodiments.

As indicated at 610, a request may be received to modify a provisioned throughput capacity for a table in a non-relational data store that is being created. For example, a request may be received via a network-based interface (e.g., API) for the data store that specifies an increase or decrease to the provisioned throughput capacity for the table. The modification may be performed, changing resource allocations for the table. For example, a number of partitions of the table may be increased or decreased, or the portion of hardware resources at one or more storage hosts for the table may be increased or decreased.

A change to the throttle threshold for creating the secondary index may also be determined, in various embodiments, according to the modification of the provisioned throughput capacity for the table, as indicated at 620. Consider the examples discussed above, where the throttle threshold is determined according to a fraction of total queue size, (e.g., determined by throughput capacity for a partition of a table multiplied by a period of time, such as ⅓ of 10 IOPS×30 seconds=100)). If the provisioned throughput capacity for the table increases, then the throughput capacity for the partition of the table may increase (e.g., to 20 IOPS). In the instant example, the throttle threshold may increase as ⅓ of 20 IOPS×30 sec=200. The change between 10 IOPS and 20 IOPS results in a change to the threshold of +100. In at least some embodiments, an increase to the provisioned throughput capacity may lead to an increase the throttle threshold. Similarly, a decrease to the provisioned throughput capacity may lead to a decrease in the throttle threshold.

As indicated at 630, the throttle threshold may be updated according to the determined change (e.g., by adding 100 to a throttle value). Subsequent attempts to index a portion of the table may be throttle or not based on the number of updates in the queue compared with the updated throttle threshold.

Figure 7:
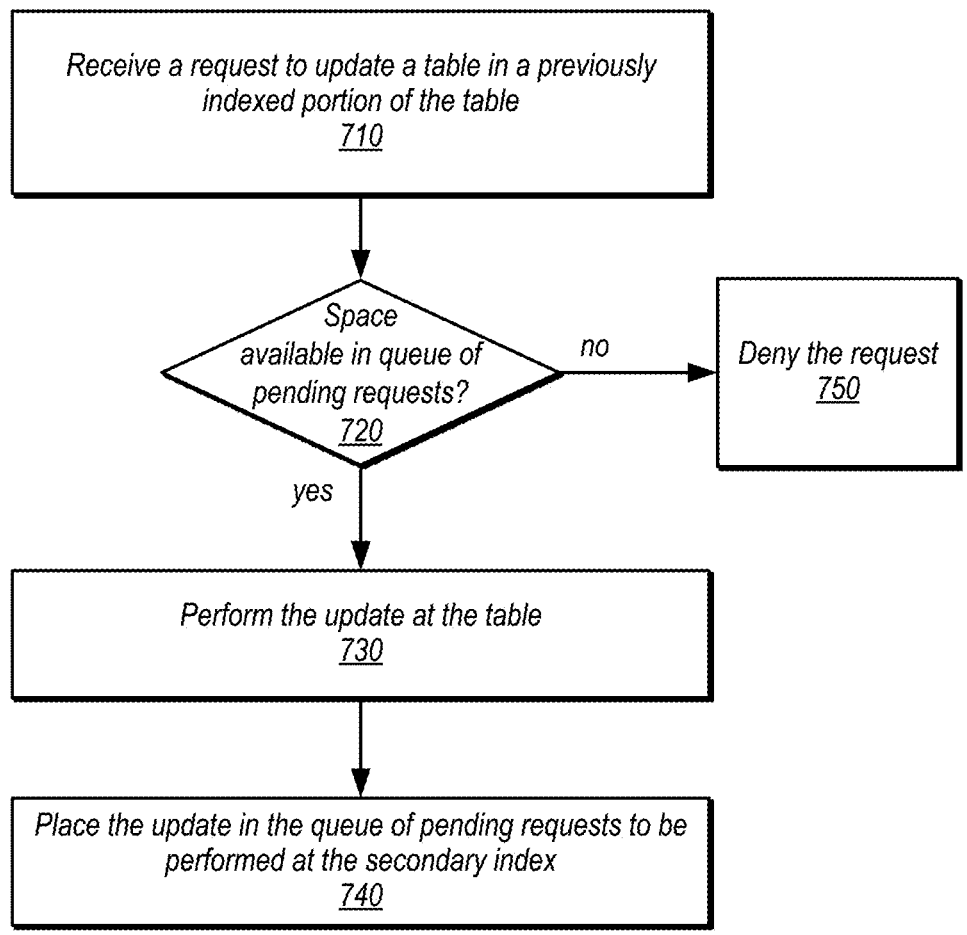
FIG. 7 is a high-level flowchart illustrating various methods and techniques for processing a request to update a table while creating a secondary index for the table, according to some embodiments.

Because a table being indexed is also online, various different access requests may be received for data stored as part of the table. Some access requests may have little impact on the creation of the secondary index. For example, read or get requests do not create inconsistent data between the table and a secondary index. Other access requests, such as update requests, may affect the performance of creating a secondary index and thus may be processed differently. FIG. 7 is a high-level flowchart illustrating various methods and techniques for processing a request to update a table while creating a secondary index for the table, according to some embodiments.

As indicated at 710, a request may be received to update a table in a previously indexed portion of the table, in various embodiments. Update requests may be received via a network-based interface for a data store hosting the table. A network-based interface for the non-relational data store may be programmatic (e.g., an API), allowing clients to format requests so as to provide the data store with enough information to process the request. For example, various requests to change, add, remove, or otherwise modify data in the table may be specified according to the API. Tracking information or other metadata may be maintained to determine whether a portion of the table has been indexed (e.g., a range of item attribute values may be updated to reflect the indexed portions of the table).

Recall that the queue of pending updates may store any update to be performed at the secondary index (or partition of the secondary index). Thus, other updates to the secondary index may be stored in the queue (e.g., those updates generated for indexing the table as discussed above), consuming space for storing received update requests. Therefore, a determination may be made as to whether space is available in a queue of pending requests to store the request, as indicated at 720. If no storage space is available (e.g., the queue is full), then the request may be denied, as indicated at 750. For instance, an error message or other failure indication may be sent to a client that sent the request.

If space is available in the queue of pending requests, then, as indicated by the positive exit from 720, the update may be performed at the table (e.g., performing the change, add, remove, or other modification to items, attributes, or attribute values of the table specified in the update request). The update may also be placed in the queue of pending requests to be performed at the secondary index, as indicated at 740.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 8:
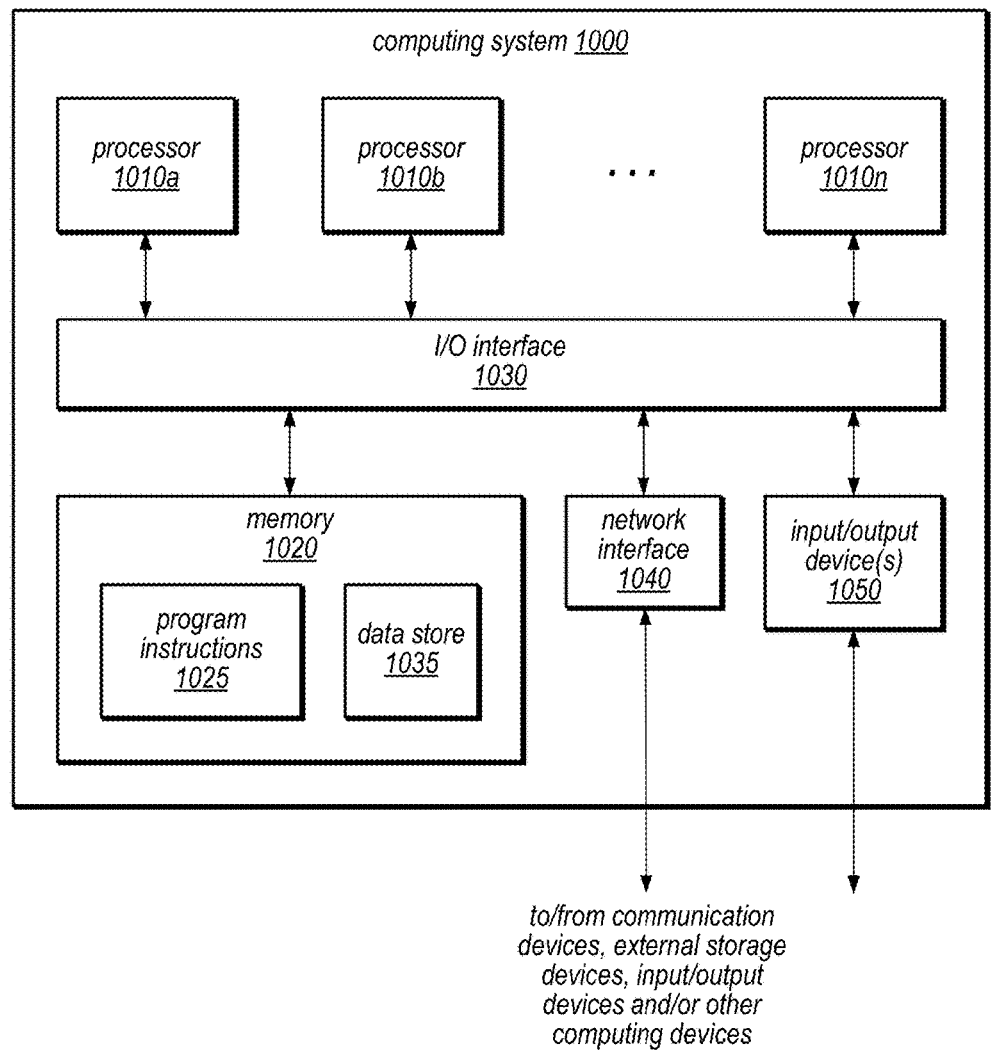
FIG. 8 is a block diagram illustrating an example computing system, according to some embodiments.

Embodiments of rate-limiting secondary index creation for an online table as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement the various embodiments of the systems as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of computing devices comprising respective processors and a memory to implement a plurality of storage nodes for a data store;
at least one of the storage nodes, configured to:
incrementally evaluate different portions of a table stored in the data store in order to create a secondary index for the table, wherein the table is available for servicing access requests during the creation of the secondary index, wherein to incrementally evaluate the different portions of the table, the at least one storage node is configured to:
scan the different portions of the table to identify items in the table that are to be included in the secondary index;
place updates to write the identified items in the secondary index in a queue of pending updates to be applied to the secondary index;
send pending updates from the queue to another storage node hosting at least a portion of the secondary index to which the pending updates are applied; and
remove the pending updates applied to the secondary index from the queue; and
prior to the evaluation of individual ones of the portions of the table for the secondary index, compare a number of pending updates to the secondary index in the queue with respect to a throttle threshold for the secondary index in order to throttle the evaluation of a portion of the table when the number of pending updates in the queue exceeds the throttle threshold, wherein the evaluation of at least one of the portions is throttled.

2. The system of claim 1, wherein the storage node is further configured to:
for one other portion of the table:
in response to a determination that the number of pending updates to the secondary index in the queue does not exceed the throttle threshold according to the comparison for the one other portion, perform the scan and the placement for the one other portion of the table.

3. The system of claim 1, wherein the storage node is configured to determine the throttle threshold according to a provisioned throughput capacity specified for the table.

4. The system of claim 1, wherein the table is partitioned across different storage nodes of the plurality of storage nodes, including the storage node, wherein other ones of the different storage nodes are configured to perform the evaluation for other portions of the table and the comparison for pending updates in respective queues at the other ones of the different storage nodes.

5. A method, comprising:
performing, by one or more computing devices:
incrementally indexing a table stored in a data store in order to create a secondary index for the table, wherein the table is available for servicing access requests during the creation of the secondary index, wherein the indexing comprises:
maintaining updates to the secondary index determined as part of indexing different portions of the table in a queue of pending updates to the secondary index, wherein the pending updates are subsequently applied to the secondary according to the queue;
prior to indexing individual ones of the portions of the table for the secondary index, evaluating a number of pending updates to the secondary index in the queue with respect to a throttle threshold for the secondary index; and
for at least one of the different portions:
in response to determining that the number of pending updates to the secondary index in the queue exceeds the throttle threshold according to the evaluation, throttling the indexing of the at least one portion of the table for the secondary index.

6. The method of claim 5, further comprising:
for one other portion of the table:
in response to determining that the number of pending updates to the secondary index in the queue does not exceed the throttle threshold according to the evaluation, performing the indexing of the one other portion, comprising:
analyzing the portion of the table to generate one or more new updates to the secondary index; and
placing the one or more new updates into the queue of pending updates.

7. The method of claim 5, further comprising determining the throttle threshold according to a provisioned throughput capacity specified for the table.

8. The method of claim 7, further comprising:
receiving a request to modify the provisioned throughput capacity for the table;
determining a change to the throttle threshold according to the modification of the provisioned throughput capacity; and
updating the throttle threshold such that subsequent evaluations of the number of pending updates are performed with respect to the updated throttle threshold.

9. The method of claim 8, wherein the request to modify the provisioned throughput capacity is a request to increase the provisioned throughput capacity and wherein the change to the throttle threshold is an increase of the throttle threshold.

10. The method of claim 7, wherein the secondary index is stored in a plurality of partitions.

11. The method of claim 5, further comprising:
during the indexing of the table:
receiving a request to update the table in a previously indexed portion from a client;
performing the request to update the table; and
placing a corresponding update for the request in the queue of pending updates, wherein the corresponding update is included in subsequent evaluations of the number of pending updates to the secondary index until the corresponding update is applied to the secondary index and removed from the queue of pending updates.

12. The method of claim 5, wherein the table is stored in a plurality of partitions, wherein the maintaining, the evaluating, and the throttling are performed by a storage node hosting one of the partitions, wherein other storage nodes host the remaining partitions of the table, wherein the other storage nodes perform the maintaining, and the evaluating with respect to the same throttle threshold.

13. The method of claim 5, wherein the data store is non-relational storage service, wherein the table is stored for a client of the storage service, and wherein the indexing of the secondary index is performed in response to a request to create the secondary index received from the client.

14. A non-transitory, computer-readable storage medium, storing program instructions that when executed by one or more computing devices cause the one or more computing devices to implement a storage node for a data store, wherein the storage node implements:
incrementally indexing portions a table stored in a data store in order to create a secondary index for the table, wherein the table is available for servicing access requests during the creation of the secondary index, wherein the indexing comprises:
placing updates to the secondary index determined as part of indexing the portions of the table in a queue of pending updates to the secondary index, wherein a pending update is removed from the queue upon application of the pending update at the secondary index; and
prior to indexing individual ones of the portions of the table for the secondary index, evaluating a number of pending updates in the queue with respect to a throttle threshold for the secondary index in order to throttle indexing of a portion of the table when the number of pending updates in the queue exceeds the throttle threshold, wherein the indexing of at least one of the portions of is throttled.

15. The non-transitory, computer-readable storage medium of claim 14, wherein the storage node further implements:
for another portion of the table:
in response to determining that the number of pending updates to the secondary index in the queue does not exceed the throttle threshold according to the evaluation, performing the indexing of the other portion, comprising:

analyzing the portion of the table to generate one or more new updates to the secondary index; and placing the one or more new updates into the queue of pending updates.

16. The non-transitory, computer-readable storage medium of claim 14, wherein the storage node further implements determining the throttle threshold according to a provisioned throughput capacity specified for the table.

17. The non-transitory, computer-readable storage medium of claim 16, wherein the storage engine further implements:

receiving a request to modify the provisioned throughput capacity for the table;

determining a change to the throttle threshold according to the modification of the provisioned throughput capacity; and updating the throttle threshold such that subsequent evaluations of the number of pending updates are performed with respect to the updated throttle threshold.

18. The non-transitory, computer-readable storage medium of claim 16, wherein the request to modify the provisioned throughput capacity is a request to decrease the provisioned throughput capacity and wherein the change to the throttle threshold decreases the throttled threshold.

19. The non-transitory, computer-readable storage medium of claim 14, wherein the storage node further implements:

during the indexing of the table:

receiving a request to update the table in a previously indexed portion from a client;

determining that the there is no available space to store the request in the queue; and denying the request.

20. The non-transitory, computer-readable storage medium of claim 14, wherein the storage node is implemented as part of a network-based storage service, wherein the table is stored for a client of the storage service, and wherein the indexing of the secondary index is performed in response to a request to create the secondary index received from the client.

* * * * *